Sept. 29, 1970  W. ETTER  3,531,192
MOTION-PICTURE PROJECTOR FOR CASSETTES
Filed Oct. 31, 1968
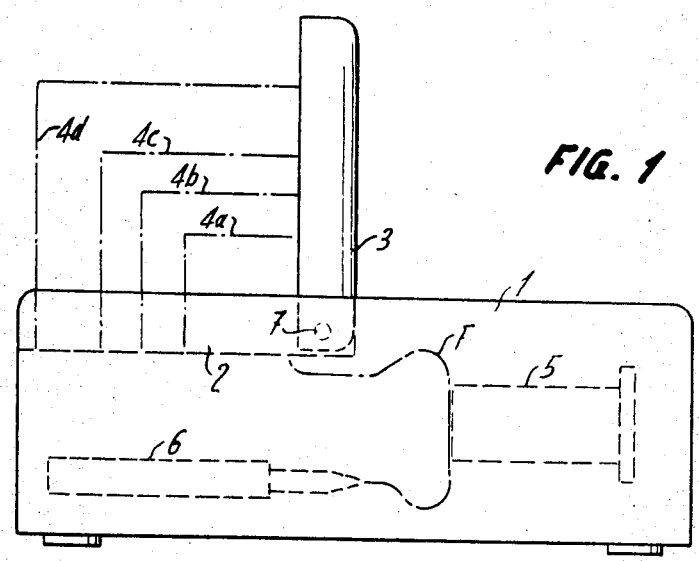
FIG. 1
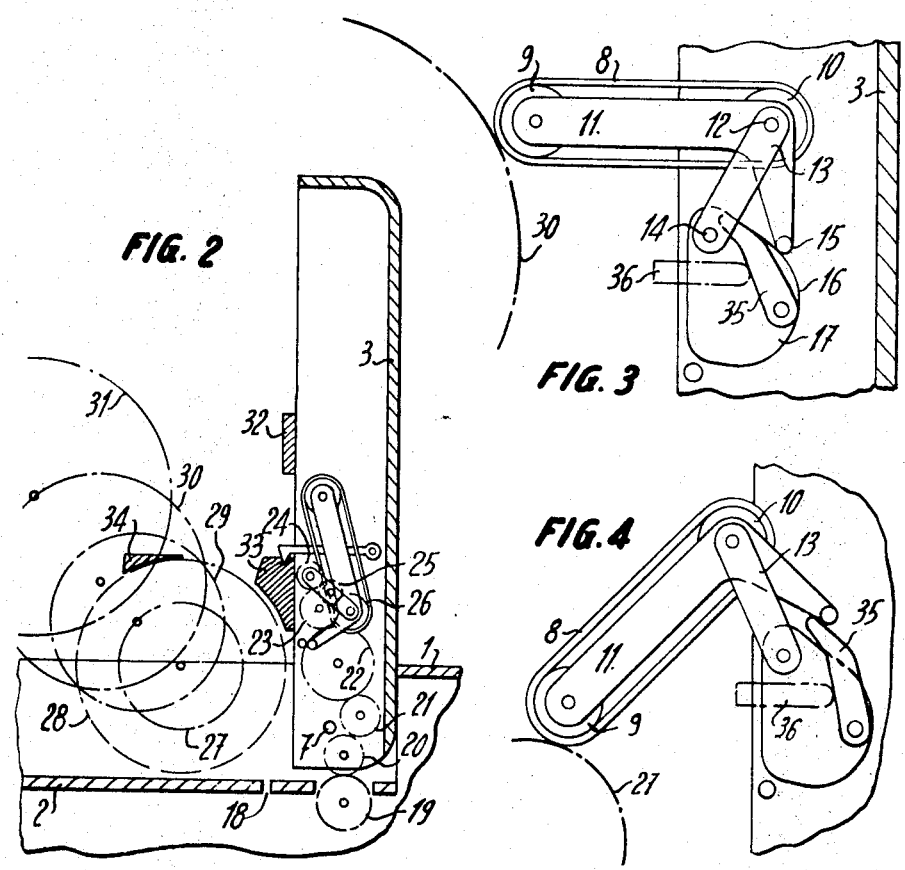
FIG. 2
FIG. 3
FIG. 4

United States Patent Office 3,531,192
Patented Sept. 29, 1970

3,531,192
MOTION-PICTURE PROJECTOR FOR CASSETTES
Walter Etter, Grandson, Vaud, Switzerland, assignor to Paillard S.A., Vaud, Switzerland, a company of Switzerland
Filed Oct. 31, 1968, Ser. No. 772,205
Claims priority, application Switzerland, Dec. 12, 1967, 17,385/67
Int. Cl. G02b 21/02; G11b 15/32
U.S. Cl. 352—72                                                10 Claims

ABSTRACT OF THE DISCLOSURE

Projector, for cassettes of different sizes and holding films of different lengths, has a pivotally mounted belt film drive of which the movement is controlled by one of two cams, in dependence on the size of the cassette loaded, so as to ensure that the belt drive partly enters the cassette and drivingly engages the film.

BACKGROUND OF THE INVENTION

The invention relates to a motion-picture projector for cassettes.

Projectors of this kind are known in the prior art, and can be loaded with cassettes, or cartridges, of different sizes containing films of various lengths. These projectors include drive means for the film held in the cassette, the drive means being movable so that it can enter, or partly enter, the cassette through an opening in the latter, whereby it can press on the film and move the outer end of the latter towards an outlet opening in the cassette.

It is quite difficult to get the drive means to move so that it enters cassettes of different sizes and moves sufficiently far into the interior of the cassette so as to engage the film, when the amount of film is a good deal less than the maximum capacity of the cassette. Cassettes of whatever size embody an opening through which the drive means enters, this opening being relatively small in order not to affect the protection of the film or to weaken the cassette. These openings always occupy a predetermined position with respect to the projector, when the cassettes are loaded in the latter.

SUMMARY OF THE INVENTION

The purpose of the invention is to provide a motion-picture projector that can be used with cassettes having a relatively small opening through which the drive means enters the cassette. The cassettes used can be of various sizes and contain films much shorter than the maximum capacities of the cassettes.

BRIEF DESCRIPTION OF THE DRAWING

The invention will be described, with reference to the figures of the accompanying drawing, wherein:

FIG. 1 is a simplified side view of the projector of the invention;

FIG. 2 is a view in cross-section of a part of the projector shown in FIG. 1; and FIGS. 3 and 4 show, on expanded scale, the drive means in two different positions.

DESCRIPTION OF THE PREFERRED EMBODIMENT

The projector, as shown in FIG. 1, has a general box-like shape, all of the essential parts being enclosed within a case 1 that is longer and wider than it is high. The top of the case embodies a slot 2 in which an arm 3, shown raised, is mounted free to swing about a pivot 7. This arm constitutes a stop for the front edge faces of cassettes, or cartridges, of different sizes, the positions occupied by the cassettes being shown in dot-dash lines 4a, 4b, 4c, and 4d. The base of a cassette is held in the correct position by the slot 2.

FIG. 1 also shows the path of the film F within the projector, in dot-dash line. The film vertically leaves one end of the cassette base, is automatically drawn past the objective 5, shown in dash line, and finally wound onto spooling means 6 having a vertical axis. This latter provision reduces the height of the projector.

When not used, the arm 3 can be pivoted into the slot 2, which is thus closed and protected from dust. In this way, the projector has a box-like shape that is free of projections, which simplifies its storage.

The arm 3 houses a film drive arrangement, comprised, as shown in FIG. 3, of a drive belt 8 passing over two pulleys 9 and 10 carried by a lever 11. The latter is pivotally mounted on a pin 12 at one end of an arm 13 that is free to turn on a pin 14 fixed to the arm 3. The one end of the lever 11 incorporates a projection 15 that presses against the edge 16 of a cam 17. A spring, not shown, causes the lever 11 to tend to pivot clockwise with respect to the arm 13, and thus holds the projection 15 in contact with the cam 17.

When the arm 13 is pivoted clockwise, the lever 11 is moved to the position shown in FIG. 2, in which it is located entirely within the arm 3, which forms a trough. The movements of the arm 13 are controlled by a mechanism, not shown, so that, when the projector is started, the belt 8 and pulley 9 are brought into contact with the spooled film contained in the cassette. The belt is driven and frictionally moves the outer turn of the spooled film until the end of this turn is deflected by means not shown towards the cassette opening located opposite a slot 18 incorporated in the bottom of the slot 2.

A cassette suitable for a projector of this kind is described, for example, in the U.S. patent application No. 684,754, filed Nov. 21, 1967.

The drive for the belt 8 is controlled by a toothed wheel 19 mounted in the projector case 1. When the arm 3 is raised, a toothed wheel 20, carried by this arm, meshes with the wheel 19. The rotation of the latter is transmitted by a gear train, consisting of the toothed wheels 20, 21, 22, 23, 24, and 25, to a toothed wheel 26, which is carried by one end of the arm 13 and is rotationally rigid with the pulley 10.

With reference to FIG. 2, a series of circles in dot-dash line show the different positions taken by the spooled film in cassettes of different sizes, in the case where the film spooled is approximately only one-third of the capacity of the cassette. Thus, the circle 27 corresponds to the outer diameter of five meters of film wound onto a reel having a fifteen-meter capacity, the reel circumference 28 being shown in broken line. The circles 29, 30, and 31 represent the outer layers of films 10, 20, and 30 meters long, respectively, spooled on reels capable of holding 30, 60, and 120 meters of film.

The casseettes capable of holding 30, 60, and 120 meters of film are so designed as to embody an opening that is always positioned between the hatched parts 32 and 33. The smallest cassettes have a capacity of 15 meters, and their openings are positioned between the hatched parts 33 and 34.

FIG. 3 shows the positions of the arm 13 and lever 11 when the drive belt 8 contacts the outer film layer 30, which is also shown in FIG. 2. FIG. 3 also shows that the lever 11 extends substantially horizontally between the pulleys 9 and 10. The shape of the cam 17 ensures that the lever 11 remains substantially horizontal while the arm 13 moves to permit the pulley 9 to pass between the hatched parts 32 and 33 to enter a cassette. The parts 32, 33, and 34 define the length and the position of the cassette openings.

When the projector is loaded with a 15-meter cassette, of which the opening is incorporated in the upper face of the cassette rather than, as is the case with larger cassettes, in the front face, the lever 11 must move differently, in order to permit the drive belt 8 to descend quickly into the cassette opening located between the hatched parts 33 and 34. FIG. 4 shows the position of the lever 11 and the arm 13 for driving a relatively short length of film contained in a 15-meter cassette. In this case, the movement of the lever 11 is controlled by another cam 35, which is mounted next to the cam 17, and pivotal between an inactive position, shown in FIG. 3, and an active position, shown in FIG. 4, in which latter position it is held by a sliding pin 36 moved by the front face of the 15-meter cassette.

When such a cassette is loaded in the projector, the cassette front face pushed the pin to the position shown in FIG. 4; but when a larger cassette is loaded into the projector, a return spring, not shown, holds the cam in its inactive position, shown in FIG. 3. Cassettes of 30, 60, and 120 meter capacity embody in their front faces a groove or cut out located opposite the pin, so that the latter is not pushed when these cassettes are inserted.

Although the preferred embodiment has been described, the scope of, and the breadth of protection afforded to, the invention are limited solely by the appended claims.

I claim:

1. Motion-picture projector for cassettes of different sizes, each cassette holding a spooled film of one or another length up to its maximum capacity, the projector including drive means for moving the film contained in a cassette and movable to enter, or partly enter, a cassette through an inlet opening therein for cooperating with the film and to move the latter towards a film outlet opening in the cassette, and wherein the improvement comprises a lever for carrying said drive means, a first arm for moving said lever free to pivot, means for pivotally mounting said first arm, and a first cam cooperating with said lever to control the position thereof, independently of the path taken thereby, while said first arm pivots for ensuring that said drive means enters the cassette of the size loaded and drivingly contacts the film therein.

2. The projector as defined in claim 1, including a plurality of spaced means for defining the position and length of the cassette inlet opening and between which means said first cam constrains said lever to move.

3. The projector as defined in claim 1, wherein said lever incorporates a bend, and said first cam is stationary and cooperates with one end of said lever.

4. The projector as defined in claim 3, including means incorporated by said one lever end for cooperating with said first cam, and wherein said drive means is located on said lever remote from said one one lever end.

5. The projector as defined in claim 3, including a pivotally mounted second cam movable between an inactive position, and an active position in which it cooperates with said one lever end, to the exclusion of said first cam means, to cause said lever to move along a path different from that caused by said first cam means.

6. The projector as defined in claim 5, including control means for moving said second cam to its active position, said control means being positioned to be operated by cassettes smaller than a given size and having their inlet openings in a position different from that of the inlet openings of the larger cassettes, when these smaller cassettes are loaded into the projector.

7. The projector as defined in claim 6, wherein said second cam is positioned next to said first cam, and wherein said first and second cams control the movement of said lever to cause said drive means to enter respectively an inlet opening in the front edge face of the larger cassettes and an inlet opening in the upper face of the smallest cassette.

8. The projector as defined in claim 1, including a case completely enclosing the projector, said case having a generally box-like shape and being longer and wider than it is high, spooling means incorporated in the projector and having a vertical axis around which the projected film is wound up, and means incorporated in said case for receiving a vertical cassette containing a film spooled around a horizontal axis.

9. The projector as defined in claim 8, wherein said means incorporated by the case include a cassette slot embodied in the top of said case for holding the base of a cassette in the correct position, and a pivotally mounted second arm movable between a lowered position in which it covers said cassette slot, when the projector is not in use, and a raised position in which said cassette slot is uncovered, when the projector is to be used, and said second arm serves as a stop for the front vertical edge face of a cassette loaded in said cassette slot, and wherein said first arm and said drive means are mounted in said second arm.

10. The projector as defined in claim 9, wherein said second arm is trough shaped, the trough being inverted when said second arm is lowered, and said first arm and drive means are mounted in said trough.

References Cited

UNITED STATES PATENTS

| 3,342,541 | 9/1967 | Mouissie et al. | 352—123 |
|---|---|---|---|
| 3,429,518 | 2/1969 | McKee | 352—158 |
| 3,437,280 | 4/1969 | Hood et al. | 242—192 |

S. CLEMENT SWISHER, Primary Examiner

U.S. Cl. X.R.

242—192